US008516162B2

(12) United States Patent
Chiba

(10) Patent No.: US 8,516,162 B2
(45) Date of Patent: Aug. 20, 2013

(54) INFORMATION PROCESSING APPARATUS AND VIDEO SIGNAL OUTPUT CONTROLLING METHOD FOR INFORMATION PROCESSING APPARATUS

(75) Inventor: Hiroaki Chiba, Sagamihara (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/220,984

(22) Filed: Aug. 30, 2011

(65) Prior Publication Data

US 2012/0162236 A1 Jun. 28, 2012

(30) Foreign Application Priority Data

Dec. 22, 2010 (JP) ................................. 2010-286277

(51) Int. Cl.
*G06F 3/00* (2006.01)
*G06F 13/12* (2006.01)
*G06F 13/38* (2006.01)
*G06F 9/00* (2006.01)

(52) U.S. Cl.
USPC ........ 710/11; 710/8; 710/14; 710/16; 710/38; 710/62; 713/1; 713/2

(58) Field of Classification Search
None
See application file for complete search history.

(56) References Cited

U.S. PATENT DOCUMENTS

| 5,748,913 | A * | 5/1998 | Shibahara | 710/301 |
|---|---|---|---|---|
| 2002/0032877 | A1 * | 3/2002 | Iwaki | 713/320 |
| 2004/0177200 | A1 * | 9/2004 | Chu | 710/301 |
| 2005/0017980 | A1 * | 1/2005 | Chang et al. | 345/520 |
| 2005/0083247 | A1 * | 4/2005 | Juenger | 345/2.2 |
| 2005/0162336 | A1 * | 7/2005 | McClintock et al. | 345/1.1 |
| 2005/0200628 | A1 * | 9/2005 | Feng et al. | 345/530 |
| 2005/0243096 | A1 * | 11/2005 | Possley et al. | 345/520 |
| 2006/0146205 | A1 * | 7/2006 | Tang | 348/808 |
| 2006/0190646 | A1 * | 8/2006 | Feng et al. | 710/100 |
| 2007/0058643 | A1 * | 3/2007 | Perley et al. | 370/401 |

(Continued)

FOREIGN PATENT DOCUMENTS

| JP | 06-059648 | 3/1994 |
|---|---|---|
| JP | 11-272250 A | 10/1999 |
| JP | 2000-039983 | 2/2000 |
| JP | 2010-045594 | 2/2010 |

OTHER PUBLICATIONS

Notice of Reasons for Rejection mailed by Japan Patent Office on Dec. 6, 2011 in the corresponding Japanese patent application No. 2010-286277.

*Primary Examiner* — Henry Tsai
*Assistant Examiner* — Michael Sun
(74) *Attorney, Agent, or Firm* — Knobbe, Martens, Olson & Bear LLP

(57) ABSTRACT

According to one embodiment, an information processing apparatus includes a connector, a graphics controller, a port setting module, a selector and a selector controller. The port setting module sets a first port used to output a video signal generated by the graphics controller as a data transmission port compliant with a first interface standard, and sets a second port used to output the video signal as a data transmission port compliant with a second interface standard. The selector connects one of the first port and the second port to the connector. The selector controller supplies a first signal to the selector in order to connect the first port to the connector when a first external unit is connected to the connector, and supplies a second signal to the selector in order to connect the second port to the connector when a second external unit is connected to the connector.

5 Claims, 6 Drawing Sheets

(56) References Cited

U.S. PATENT DOCUMENTS

2007/0101116 A1* 5/2007 Tsuji .................................. 713/1
2010/0328540 A1* 12/2010 Wu et al. ........................ 348/723
2012/0191894 A1* 7/2012 Sasaki et al. ................... 710/313

* cited by examiner

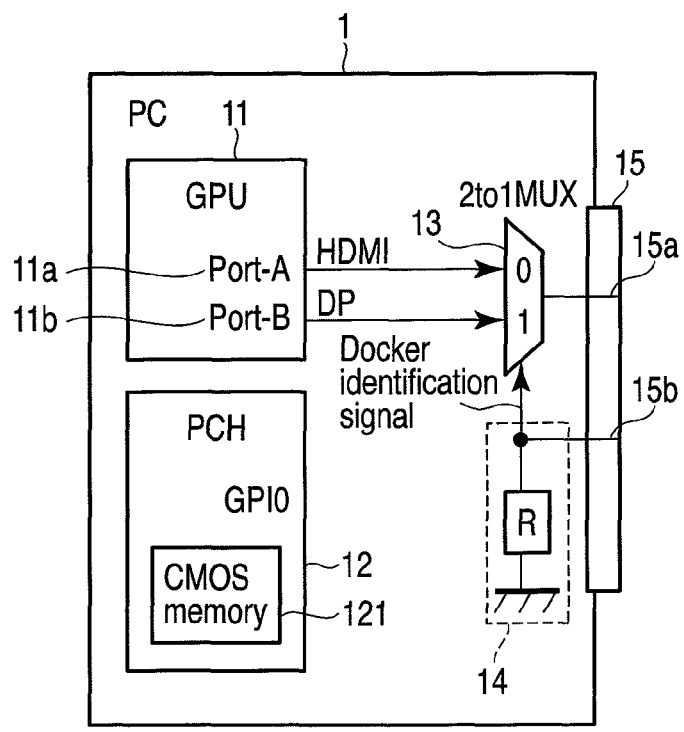
F I G. 1
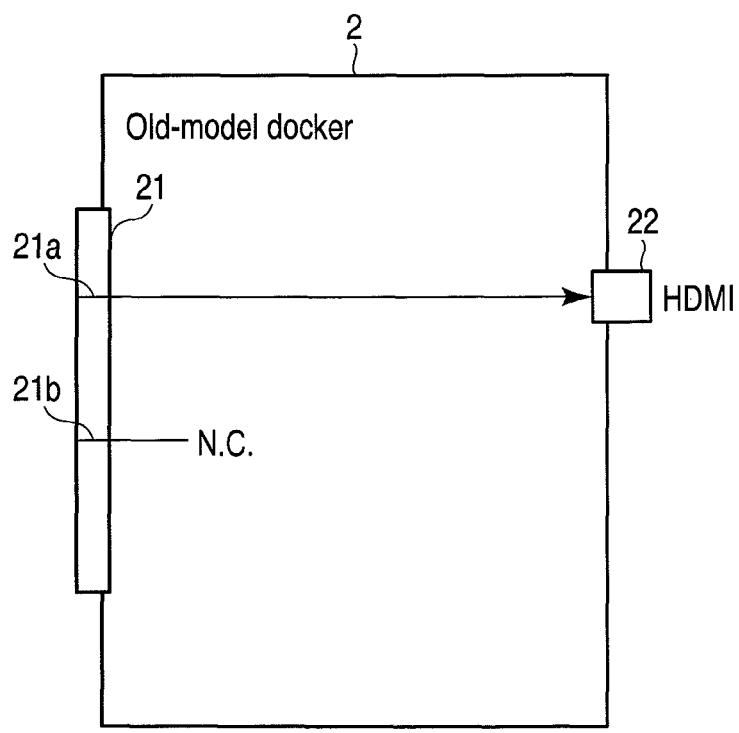
F I G. 2

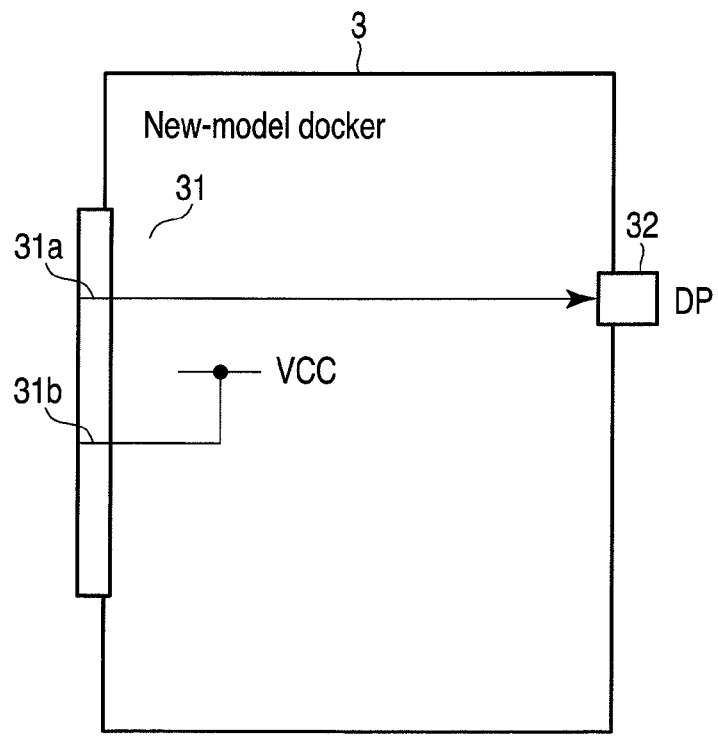
F I G. 3
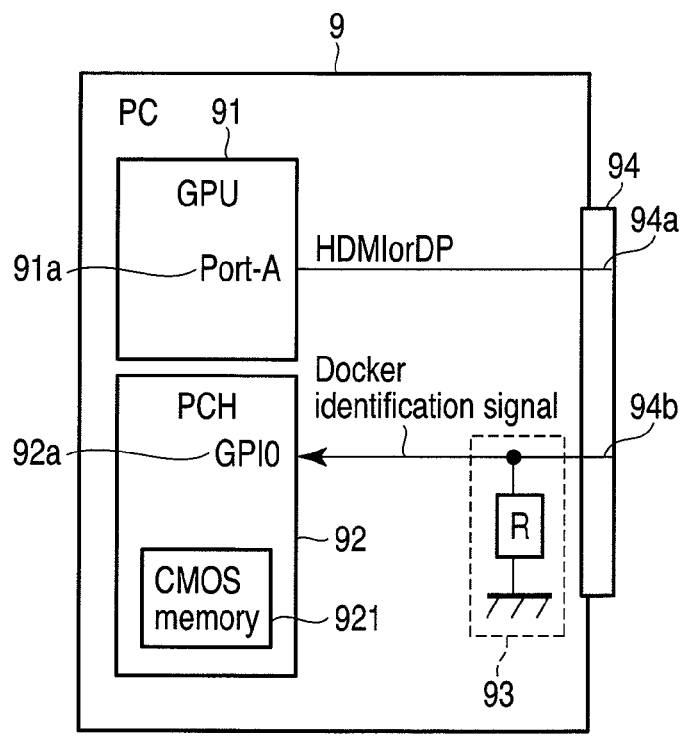
F I G. 4

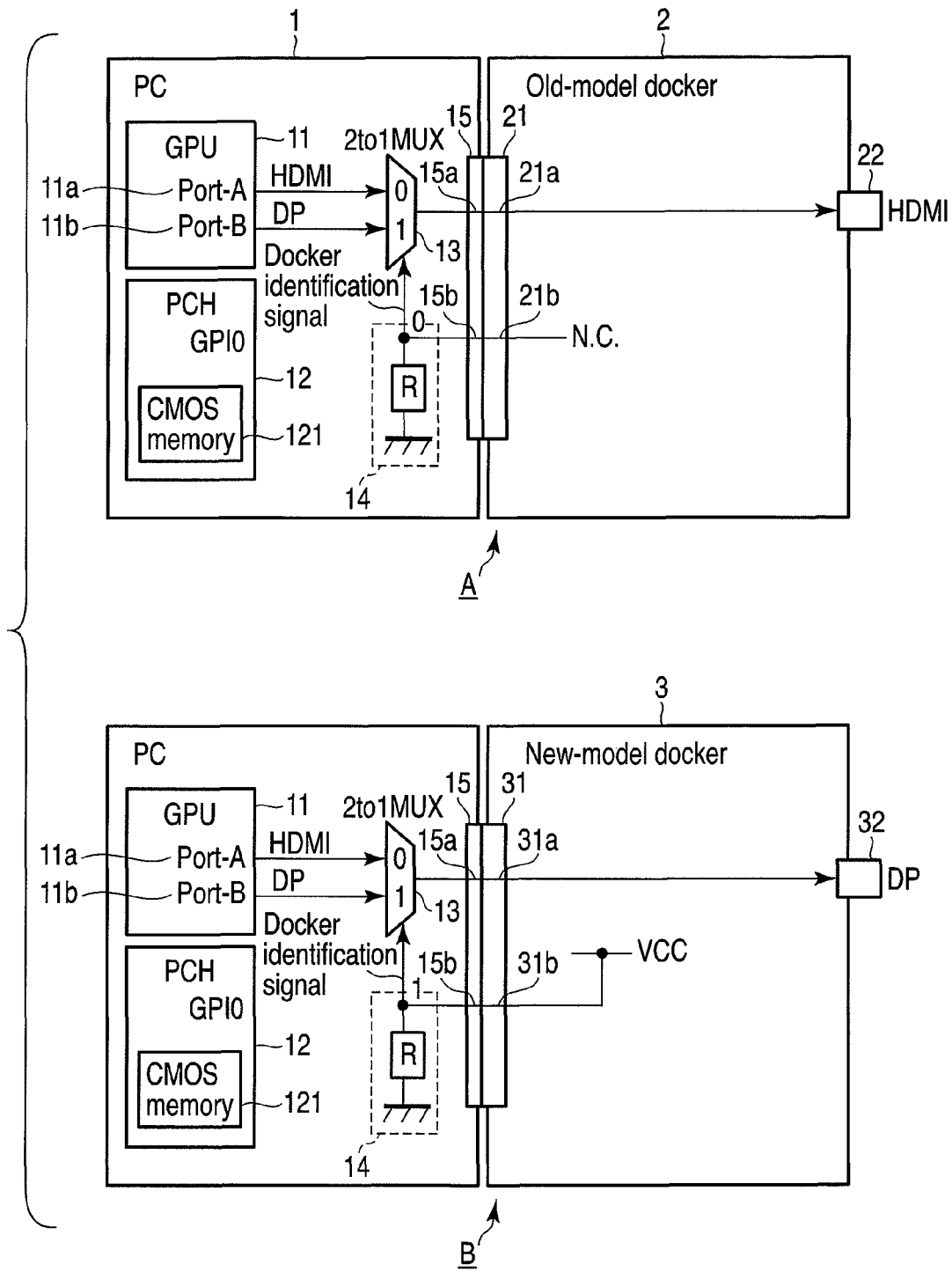
F I G. 8

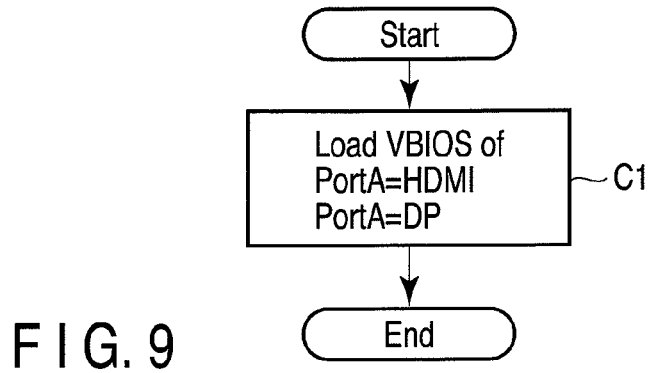
F I G. 9
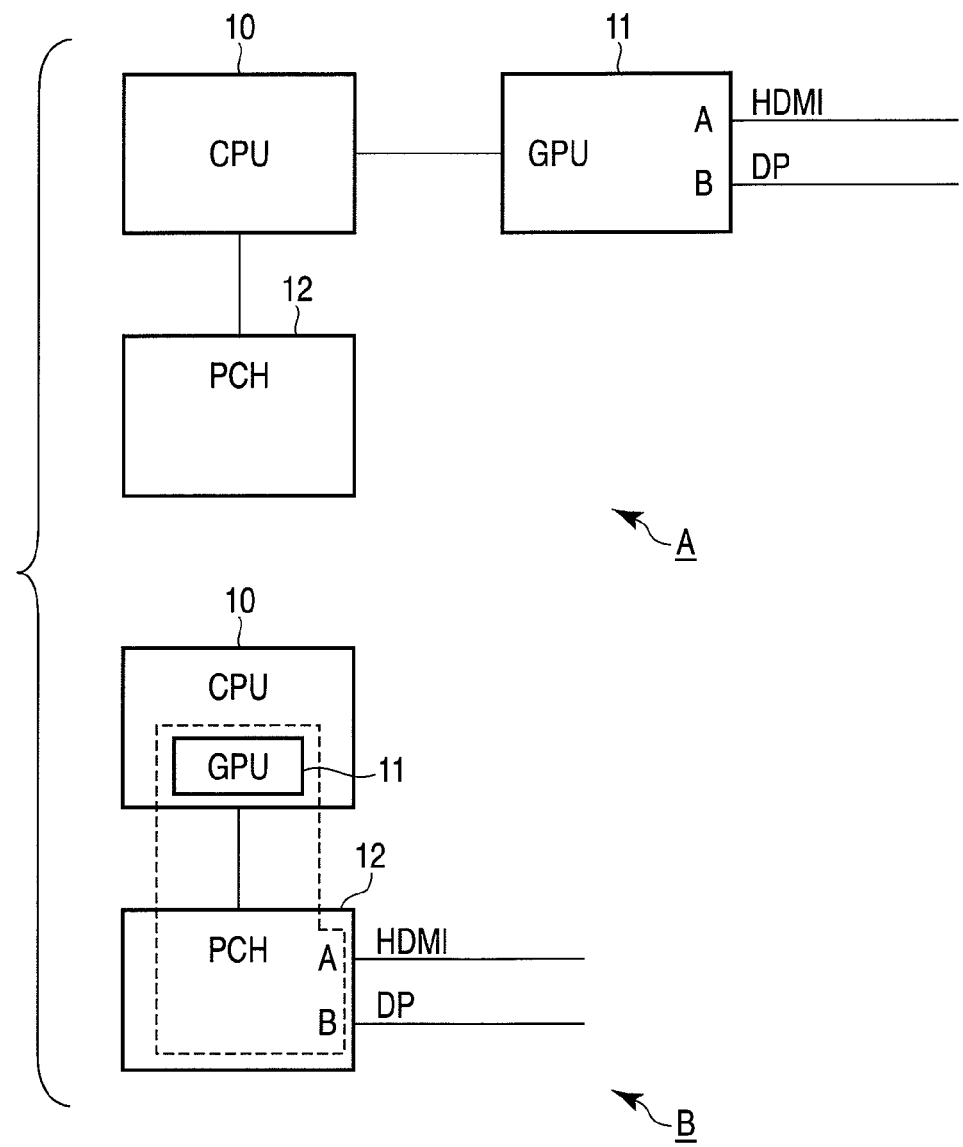
F I G. 10

INFORMATION PROCESSING APPARATUS AND VIDEO SIGNAL OUTPUT CONTROLLING METHOD FOR INFORMATION PROCESSING APPARATUS

CROSS-REFERENCE TO RELATED APPLICATIONS

This application is based upon and claims the benefit of priority from Japanese Patent Application No. 2010-286277, filed Dec. 22, 2010; the entire contents of which are incorporated herein by reference.

FIELD

Embodiments described herein relate generally to an information processing apparatus to or from which an external unit for feature expansion, which is called docker, can be attached and detached, and an output control method for a video signal in an information processing apparatus.

BACKGROUND

In recent years, various types of personal computers are widely popular such as the notebook type or desktop type. Further, of notebook type personal computers which can be driven by a battery, many of them are prepared with an external unit for feature expansion which is called docker (to be called as expansion unit). By preparing an expansion unit of this type, the notebook type personal computers achieve both portability (smaller in size and lighter in weight) and high performance at the same time, which are considered to be in the relationship of a tradeoff.

In many cases, the personal computers equipped with an expansion unit do not include a terminal which outputs a video signal to an external display. In other words, in many cases, a terminal for video signal output is provided on the side of expansion unit. In the case where an external display is used in such a personal computer, the video signal is output to the expansion unit via a connector provided for the connection with the expansion unit, and thus the video signal is output to the external display from the video signal output terminal of the expansion unit.

Here, let us suppose a case where an expansion unit is set in, for example, each of the office and at home. Further, let us suppose a case where, for example, the expansion unit set in the office is a new model, whereas the expansion unit set at home is an old-model, and the new-model expansion unit is provided with a terminal compliant with DisplayPort for outputting video signals, whereas the old-model expansion unit is provided with a terminal compliant with High-definition multimedia interface (HDMI) for outputting video signals. Further, it is supposed that the personal computer of the type which can support both of the old-model and new-model expansion units.

In the above-described case, when connecting the personal computer to the expansion unit set in the office, the port for outputting a video signal generated by the graphics processing unit (GPU) needs to be set as a video signal output port compliant with DisplayPort. On the other hand, when connected to the expansion unit set at home, the port for outputting a video signal generated by the GPU needs to be set as a video signal output port compliant with HDMI. The setting of the port is executed by loading either one of a video BIOS which sets up the port as a video signal output port compliant with HDMI and a video BIOS which sets up the port as a video signal output port compliant with DisplayPort. A video BIOS is one module in a system BIOS (basic input/output system) which executes an initialization process of the hardware.

In the meantime, it is general that personal computers of the recent model includes a power saving function which achieves the saving of power without degrading the operation efficiency of the user, which is called a suspend or a hibernation. With use of the energy saving function, the status at the time when an operation is paused is restored, and the operation is restarted continuously. The function of restoring the status at the time of immediately before a suspending or a hibernation is called resume.

Furthermore, personal computers of the recent model includes a function of being capable of attaching or detaching an external device while the power is on, which is called a plug and play.

In other words, the detaching or attaching of an expansion unit is not always carried out while the power of the personal computer is off (except for the power off state by suspend or hibernation), but it can be carried out while, for example, the power is on. The attachment of an external device while the power is on is called hot dock, whereas the detachment of an external device while the power is on is called hot undock.

Even with the above-described set-up, in the case where a personal computer separated from the expansion unit set in the office is to be connected to the expansion unit set at home, or reversely, a personal computer separated from the expansion unit set at home is to be connected to the expansion unit set in the office, the setting of the port for outputting video signals generated by the GPU must be altered, and therefore when the power of the personal computer is on, the computer needs to be restarted (reactivated) in order to reload the video BIOS.

As described above, in the case where the personal computer is attached to detached to only the expansion unit set in the office, or the personal computer is attached to detached to only the expansion unit set at hole, the restarting of the personal computer is not necessary. On the other hand, the restarting of the personal computer is required when it is re-connected between the expansion units set in the office and at home. In such operation circumstances, the user feels it troublesome to operate the computer.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 1 is an exemplary diagram showing a configuration of an information processing apparatus according to an embodiment, with respect to video signal outputs for an external unit.

FIG. 2 is an exemplary diagram showing a configuration of an old-model external display connectable to the information processing apparatus according to the embodiment, with respect to video signal outputs.

FIG. 3 is an exemplary diagram showing a configuration of a new-model external display connectable to the information processing apparatus according to the embodiment, with respect to video signal outputs for.

FIG. 4 is an exemplary diagram showing a configuration of an information processing apparatus which employs a general control method of outputting video signals, with respect to video signal outputs for an external unit.

FIG. 8 is an exemplary diagram showing a state in which an old-model expansion unit or a new-model expansion unit is connected to the information processing apparatus of the embodiment.

FIG. 9 is an exemplary flowchart of an operation procedure of the information processing apparatus of the embodiment, with respect to video signal outputs when the apparatus is started.

FIG. 10 is an exemplary diagram showing an example of arrangement of an input/output pin for outputting video signals of the image to be displayed, which are generated by the GPU of the information processing apparatus of the embodiment.

DETAILED DESCRIPTION

Figure 5:
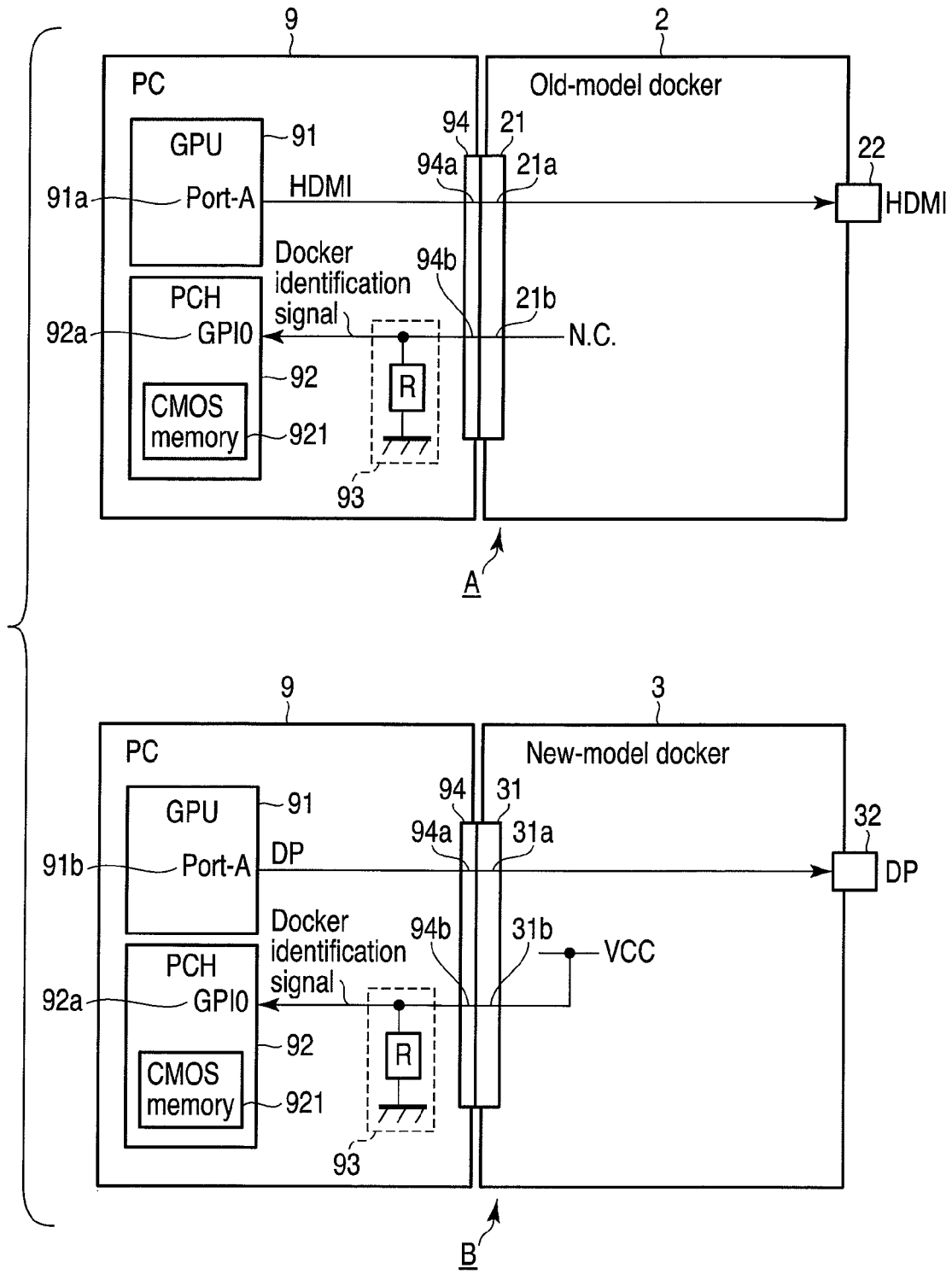
FIG. 5 is an exemplary diagram showing a state in which an old-model expansion unit or a new-model expansion unit is connected to the information processing apparatus shown in FIG. 4.

Various embodiments will be described hereinafter with reference to the accompanying drawings.

In general, according to one embodiment, an information processing apparatus includes a connector, a graphics controller, a port setting module, a selector and a selector controller. The graphics controller is configured to generate a video signal of a display image. The port setting module is configured to set a first port used to output the video signal as a data transmission port compliant with a first interface standard, and to set a second port used to output the video signal as a data transmission port compliant with a second interface standard. The selector is configured to connect one of the first port and the second port to the connector. The selector is interposed between the first port and the connector and between the second port and the connector. The selector controller is configured to supply a first signal to the selector in order to connect the first port to the connector when a first external unit is connected to the connector, and to supply a second signal to the selector in order to connect the second port to the connector when a second external unit is connected to the connector.

FIG. 1 is an exemplary diagram showing a configuration of an information processing apparatus 1 according to an embodiment, with respect to video signal outputs for an external unit. The information processing apparatus 1 is realized as, for example, a notebook type personal computer (PC) which can be driven by a battery and easily carried.

As shown in FIG. 1, the information processing apparatus 1 includes a graphics processing unit (GPU) 11, a peripheral control hub (PCH) 12, a selector (2to1 MUX) 13, a selector control circuit 14 and a connector 15.

To the information processing apparatus 1, an expansion unit can be connected in accordance with necessity. The connector 15 is provided to connect the apparatus 1 to the expansion unit.

The GPU 11 is a module which plots a display image. The video signal of the display image generated by the GPU 11 is supplied to, for example, a liquid crystal display (LCD) built in the information processing apparatus 1, to be displayed thereon, or output to the expansion unit via the connector 15. The expansion unit is provided with a terminal configured to output video signals to an external display. The video signals are supplied to the external display via the terminal, and thus the display image is displayed on the external display.

FIG. 2 and FIG. 3 each show an expansion unit connectable to the information processing apparatus 1. FIG. 2 is an exemplary diagram showing an configuration of an old-model expansion unit (old-model docker) 2, with respect to video signal outputs for an external display, whereas FIG. 3 is an exemplary diagram showing an configuration of a new-model expansion unit (new-model docker) 3, with respect to video signal outputs for an external display.

As shown in FIG. 2, the old-model expansion unit 2 includes a connector 21 configured to connect this unit to the information processing apparatus 1, and an HDMI-compliant video signal output terminal (HDMI terminal) 22. On the other hand, the new-model expansion unit 3, as shown in FIG. 3, includes a connector 31 configured to connect this unit to the information processing apparatus 1, and a DisplayPort-compliant video signal output terminal (DP terminal) 32. That is, the information processing apparatus 1 must output video signals of an image to be displayed, which are generated by the GPU 11 in compliance with HDMI in the case where the old-model expansion unit 2 is connected, whereas it must output video signals in compliance with DisplayPort in the case where the new-model expansion unit 3 is connected.

The setting of the port which is provided in the GPU 11 and configured to output video signals of an image to be displayed, which are generated by the GPU 11 is executed usually by selectively loading a video BIOS, which is one module in the system BIOS. More specifically, the setting is executed by loading either one of the video BIOS configured to set the port as a video signal output port compliant with HDMI and the video BIOS configured to set the port as a video signal output port compliant with DisplayPort. Therefore, the timing to set the port (such as to output video signals of an image to be displayed) is limited to the starting (activating) of the information processing apparatus. Here, in order to assist the understanding of a video signal output control method employed in the information processing apparatus 1, a video signal output control method generally employed will now be described with reference to FIG. 4, FIG. 5, FIG. 6 and FIG. 7 in addition to FIG. 2 and FIG. 3 mentioned above.

As shown in FIG. 2, in the old-model expansion unit 2, the input/output pin 21a configured to input the video signals is provided in the connector 21. On the other hand, in the new-model expansion unit 3, the input/output pin 31a configured to input the video signals is provided in the connector 31. The input/output pin 21a of the old-model expansion unit 2 and the input/output pin 31a of the new-model expansion unit 3 are arranged at positions corresponding to each other.

Further, the input/output pin 21b of the old-model expansion unit 2 and the input/output pin 31b of the new-model expansion unit 3 are arranged at positions corresponding to each other, and only in the new-model expansion unit 3, the input/output pin 31b is pulled up.

FIG. 4 is an exemplary diagram showing a configuration of an information processing apparatus 9 which employs a general control method of outputting video signals, with respect to video signal outputs for an external unit.

As shown in FIG. 4, the information processing apparatus 9 includes a GPU 91, a PCH 12, an identification signal generation circuit 93 and a connector 94.

In the information processing apparatus 9, an input/output pin 94a configured to output video signals and input/output pin 94b for identifying the expansion unit are provided in the connector 94. The input/output pin 94a in the connector 94 is connected to a port (Port-A) 91a of the GPU 91, whereas the input/output pin 94b in the connector 94 is connected to a port (GPIO: general purpose input/output) 92a of the PCH 92.

The input/output pins 21a and 21b of the old-model expansion unit 2 and the input/output pins 31a and 31b of the new-model expansion unit 3 are arranged at position opposing the input/output pins 94a and 94b of the information processing apparatus 9. Further, as mentioned before, only in the new-model expansion unit 3, the input/output pin 31b is pulled up. The identification signal generation circuit 93, when the signal line electrically continuous to the destination of the connection via the input/output pin 94b is not pulled up, generates an identification signal of Low level (0), whereas it generates an identification signal of High level (1) when the signal line is pulled up.

That is, based on the identification signal generated by the identification signal generation circuit 93, it is possible to judge as to whether the expansion unit connected to the connector 94 is the old-model expansion unit 2 or the new-model expansion unit 3. More specifically, when the identification signal is "0", it is judged that the old-model expansion unit 2 is connected, whereas when the identification signal is "1", it is judged that the new-model expansion unit 3 is connected. Then, generally, as shown in FIG. 4, the destination of input of the identification signal is assigned to the port 92a of the PCH 92 and the input value of the port 92a of the PCH 92 is read out. Then, the port 91a of the GPU 91 is set as a video signal output port compliant with HDMI or a video signal output port compliant with DisplayPort. Further, in, for example, the CMOS memory 921 built in the PCH 92, the identification signal read out is recorded so as to be able to judge in a later stage as to which expansion unit has been connected thereto.

FIG. 5 is an exemplary diagram showing a state in which the old-model expansion unit 2 or the new-model expansion unit 3 is connected to the information processing apparatus 9. The symbol "A" indicates that the old-model expansion unit 2 is connected to the information processing apparatus 9, whereas the symbol "B" indicates that the new-model expansion unit 3 is connected to the information processing apparatus 9.

In the case where the old-model expansion unit 2 is connected, a value "0" is input to the port 92a of the PCH 92 as shown in "A" of FIG. 5. Therefore, the port 91a of the GPU 91 is set as a video signal output port compliant with HDMI. On the other hand, in the case where the new-model expansion unit 3 is connected, a value "1" is input to the port 92a of the PCH 92 as shown in "B" of FIG. 5. Therefore, the port 91a of the GPU 91 is set as a video signal output port compliant with DisplayPort.

Based on the above, the procedure of the video signal output control executed by the information processing apparatus 9 will now be described with reference to FIG. 6 and FIG. 7.

Figure 6:
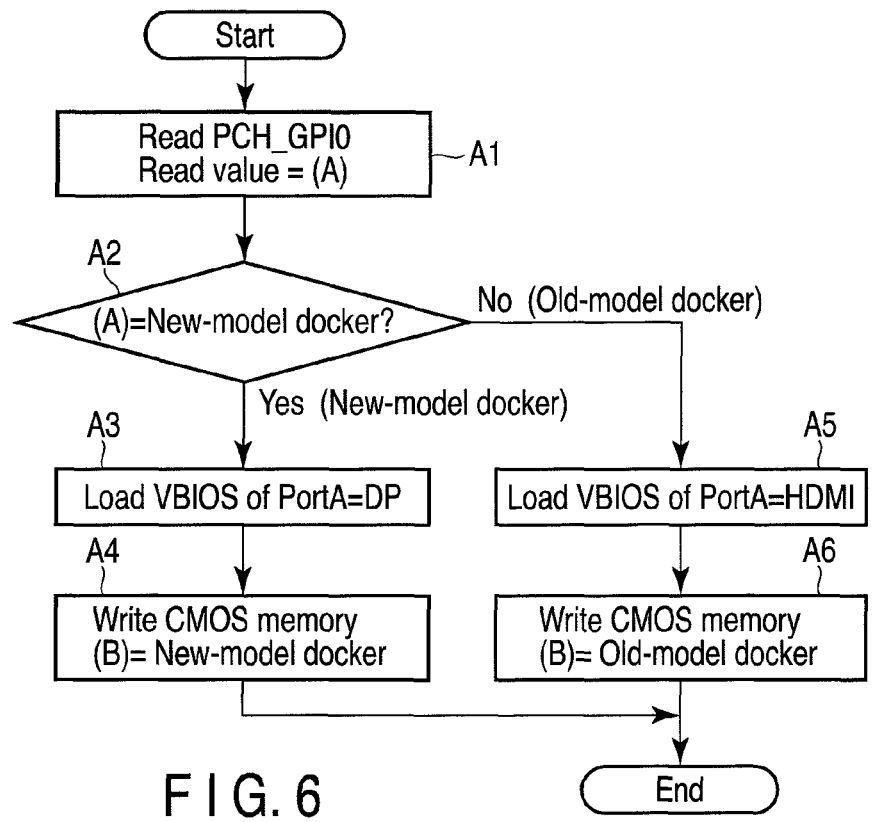
FIG. 6 is an exemplary flowchart of an operation procedure of the information processing apparatus shown in FIG. 4, with respect to video signal outputs when the apparatus is stared while the old-model expansion unit or new-model expansion unit being connected.

FIG. 6 is an exemplary flowchart of an operation procedure of the information processing apparatus 9, with respect to video signal outputs when the processing apparatus 9 is started while either one of the old-model expansion unit 2 and the new-model expansion unit 3 is connected thereto.

When the information processing apparatus 9 is started, for example, the system BIOS reads the input value of the port 92a of the PCH 92 (block A1). Subsequently, the system BIOS examines whether or not the input value of the port 92a of the PCH 92 indicates the new-model expansion unit 3 (block A2). When the input value indicates the new-model expansion unit 3 (YES in the block A2), the system BIOS loads the video BIOS configured to set the port 91a of the GPU 91 as a video signal output port compliant with Display-Port (block A3), and record the value which indicates the new-model expansion unit 3 in a CMOS memory 921 of the PCH 92 (block A4).

On the other hand, when the input value indicates the old-model expansion unit 2 (NO in the block A2), the system BIOS loads the video BIOS configured to set the port 91a of the GPU 91 as a video signal output port compliant with HDMI (block A5), and record the value which indicates the old-model expansion unit 2 in the CMOS memory 921 of the PCH 92 (block A6).

Figure 7:
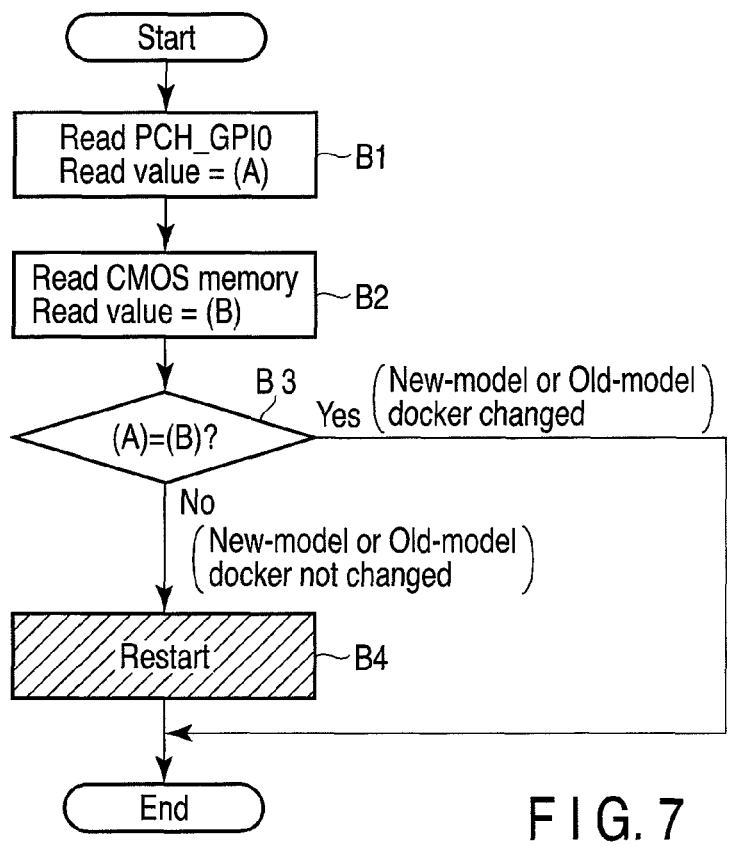
FIG. 7 is an exemplary flowchart of an operation procedure of the information processing apparatus shown in FIG. 4, with respect to video signal outputs when either one of the old-model expansion unit and new-model expansion unit is connected to the apparatus while the apparatus is in operation.

FIG. 7 is an exemplary flowchart of an operation procedure of the information processing apparatus 9, with respect to video signal outputs when either one of the old-model expansion unit 2 and the new-model expansion unit 3 is connected to the apparatus 9 while the apparatus 9 is in operation.

When either one of the old-model expansion unit 2 and the new-model expansion unit 3 is connected thereto, for example, the OS or a utility prepared as a resident program reads the input value of the port 92a of the PCH 92 (block B1), and further reads the values in the CMOS memory 921 of the PCH 92 (block B2).

The OS or utility examines whether or not the two values read out coincide with each other (block B3). When the values do not coincide with each other (NO in block B3), the information processing apparatus 9 is restarted (block B4). With this restarting, the video BIOS configured to appropriately set the port 91a of the GPU 91 is reloaded to follow the operation procedure shown in FIG. 6.

However, this restating makes the user feel troublesome to operate the processing apparatus. As a solution to this, the information processing apparatus 1 is formed such that the restarting is not necessary even if the old-model expansion unit 2 and the new-model expansion unit 3 are switched over while the apparatus 1 is in operation. This point will now be described in detail.

As shown in FIG. 1, the information processing apparatus 1 sets a port (Port-A) 11a of the GPU 11 as the video signal output port compliant with HDMI, and in parallel with this, the apparatus 1 sets a port (Port-B) 11b of the GPU 11 as the video signal output port compliant with DisplayPort. More specifically, the information processing apparatus 1 is provided with video BIOS (port setting module) which sets the port 11a of the GPU 11 as the video signal output port compliant with HDMI, and also sets the port 11b of the GPU 11 as the video signal output port compliant with DisplayPort, and when the apparatus 1 is started, the video BIOS is loaded.

Further, in the information processing apparatus 1, a selector 13 is interposed between the port 11a and the port 11b of the GPU 11 and an input/output pin 15a so as to electively connect the port 11a of the GPU 11 or the port 11b of the GPU 11 to the input/output pin 15a of the connector 15.

Further, the information processing apparatus 1 designates the destination of the output of a selector control circuit 14 (which corresponds to the identification signal generation circuit 93 of the information processing apparatus 9 described above) as the selector 13.

FIG. 8 is an exemplary diagram showing a state in which the old-model expansion unit 2 or the new-model expansion unit 3 is connected to the information processing apparatus 1. The symbol "A" indicates a state where the old-model expansion unit 2 is connected to the information processing apparatus 1, whereas the symbol "B" indicates a state where the new-model expansion unit 3 is connected to the information processing apparatus 1.

In the case where the old-model expansion unit 2 is connected, "0" is input to the selector 13 as shown in "A" of FIG. 8, and thus the port 11a of the GPU 11 is connected to the input/output pin 15a of the connector 15 via the selector 13. On the other hand, in the case where the new-model expansion unit 3 is connected, "1" is input to the selector 13 as shown in "B" of FIG. 8, and thus the port 11b of the GPU 11 is connected to the input/output pin 15a of the connector 15 via the selector 13.

As described above, when started, the information processing apparatus 1 loads the video BIOS which sets the port 11a of the GPU 11 as the video signal output port compliant with HDMI and also sets the port 11b of the GPU 11 as the video signal output port compliant with DisplayPort. Thus, even if the old-model expansion unit 2 and the new-model expansion unit 3 are switched over while the apparatus 1 is in operation, the restarting of the apparatus 1 for reloading the video BIOS is not required.

FIG. 9 is an exemplary flowchart of an operation procedure of the information processing apparatus 1, with respect to video signal outputs when the apparatus 1 is started.

When starting the information processing apparatus 1, for example, the system BIOS loads the video BIOS which sets the port 11a of the GPU 11 as the video signal output port compliant with HDMI and also sets the port 11b of the GPU 11 as the video signal output port compliant with DisplayPort (Block C1).

After starting of the apparatus 1, the other operations of the apparatus 1 can be dealt with only the switching of the selector 13, and therefore the judgment as to which one of the old-model expansion unit 2 and the new-model expansion unit 3 is connected is not required. Further, in the information processing apparatus 1, the operation for the video signal output in the case where either one of the old-model expansion unit 2 and the new-model expansion unit 3 is connected while the apparatus 1 is in operation (as shown in FIG. 7) is not required.

It should be noted that the above-provided explanation is directed to the examples in which the input/output pin for outputting the video signals of the display image generated by the GPU 11 is provided in the GPU 11. However, the video signal output control method of the information processing apparatus 1 is not limited to this. FIG. 10 is an exemplary diagram showing an example of arrangement of the input/output pin for outputting video signals of the image to be displayed, which are generated by the GPU 11.

In FIG. 10, "A" illustrates an example of the arrangement of the input/output pin for video signal output in the case where the GPU 11 is externally connected to the central processing unit (CPU) 10. In this case, as described above, the input/output pin for outputting video signals of the display image, generated by the GPU 11, is provided in the GPU 11. On the other hand, "B" illustrates an example of the arrangement of the input/output pin for video signal output in the case where the GPU 11 is built in the CPU 10. In this case, the input/output pin for outputting video signals of the display image, generated by the GPU 11, is provided in the PCH 12. Further, in the case, the video BIOS sets one port of the PCH 12 as the video signal output port compliant with HDMI and also sets another port of the PCH 12 as the video signal output port compliant with DisplayPort. Furthermore, the selector 13 is interposed between the PCH 12 and the connector 15. It is only natural that the video signal output control method of the information processing apparatus 1 is applicable to the structure illustrated in "B" as well.

The various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An information processing apparatus with a connector to which either a first external unit or a second external unit is connected, comprising:
    a graphics controller configured to generate a video signal associated with a display image, and comprising a first port and a second port;
    a video basic input/output system (BIOS) configured to execute first port setting processing and second port setting processing when the information processing apparatus is activated, the first port setting processing being executed to set the first port as a first data transmission port compliant with a first interface standard, and the second port setting processing being executed to set the second port as a second data transmission port compliant with a second interface standard;
    a selector configured to connect one of the first port and the second port to the connector, the selector positioned between the first port and the connector and between the second port and the connector; and
    a selector controller configured to supply a first signal to the selector to connect the first port to the connector when the first external unit is connected to the connector, and to supply a second signal to the selector to connect the second port to the connector when the second external unit is connected to the connector.

2. The apparatus of claim 1, wherein:
    the first interface standard comprises HDMI (High-definition multimedia interface); and
    the second interface standard comprises DisplayPort.

3. The apparatus of claim 1, wherein:
    the first external unit comprises a first expansion unit comprising the first data transmission port compliant with the first interface standard; and
    the second external unit comprises a second expansion unit comprising the second data transmission port compliant with the second interface standard.

4. An information processing apparatus with a connector to which either a first external unit or a second external unit is connected, comprising:
    a central processing unit (CPU) comprising a graphics controller configured to generate a video signal associated with a display image;
    a peripheral control hub (PCH) connected to the CPU, the PCH comprising a first port and a second port;
    a video basic input/output system (BIOS) configured to execute first port setting processing and second port setting processing when the information processing apparatus is activated, the first port setting processing being executed to set the first port as a first data transmission port compliant with a first interface standard, and the second port setting processing being executed to set the second port as a second data transmission port compliant with a second interface standard;

a selector configured to connect one of the first port and the second port to the connector, the selector positioned between the first port and the connector and between the second port and the connector; and a selector controller configured to supply a first signal to the selector to connect the first port to the connector when the first external unit is connected to the connector, and to supply a second signal to the selector to connect the second port to the connector when the second external unit is connected to the connector.

5. A video signal output controlling method for an information processing apparatus with a connector to which either a first external unit or a second external unit is connected, the method comprising:

executing first port setting processing and second port setting processing when the information processing apparatus is activated, the first port setting processing being executed to set a first port as a first data transmission port compliant with a first interface standard, and the second port setting processing being executed to set a second port as a second data transmission port compliant with a second interface standard, the first port and the second port being provided in a graphics controller configured to generate a video signal associated with a display image; and supplying a first signal to a selector to connect the first port to the connector when the first external unit is connected to the connector, and supplying a second signal to the selector to connect the second port to the connector when the second external unit is connected to the connector, the selector configured to connect one of the first port and the second port to the connector.

* * * * *